No. 795,069. PATENTED JULY 18, 1905.
R. F. SETTLAGE.
HOSE COUPLING.
APPLICATION FILED JUNE 27, 1904.
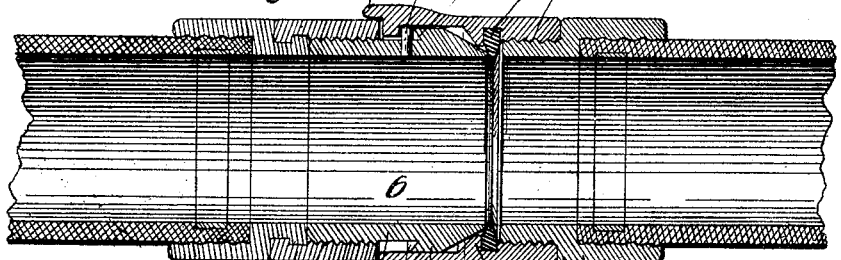
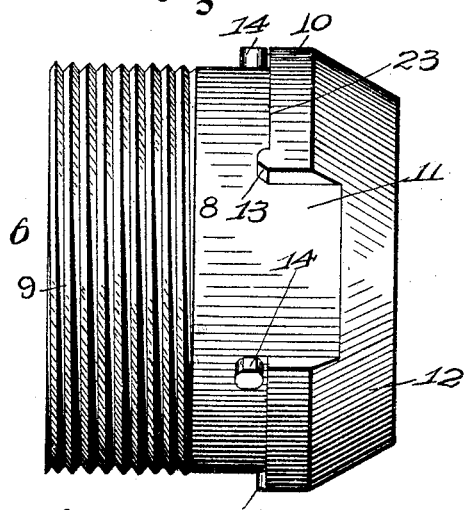
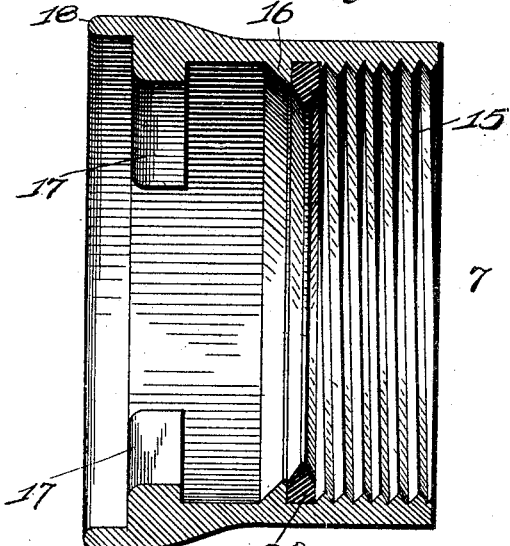
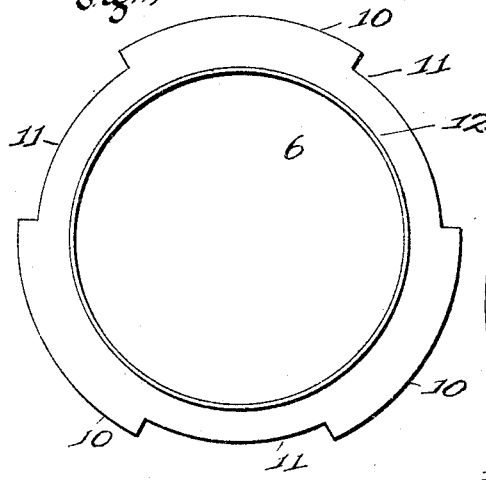
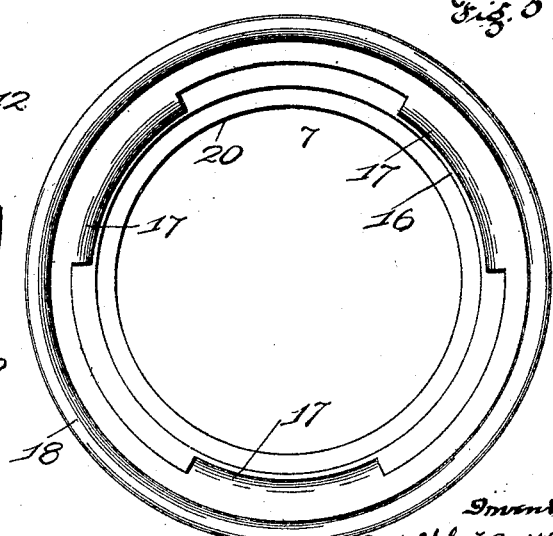
Witnesses
Fred Michels
Henry W. Potter
Inventor
Rudolph F. Settlage No. 795,069. Patented July 18, 1905.

UNITED STATES PATENT OFFICE.

RUDOLPH F. SETTLAGE, OF ST. LOUIS, MISSOURI.

HOSE-COUPLING.

SPECIFICATION forming part of Letters Patent No. 795,069, dated July 18, 1905.

Application filed June 27, 1904. Serial No. 214,227.

*To all whom it may concern:*

Be it known that I, RUDOLPH F. SETTLAGE, a citizen of the United States, residing at St. Louis, in the State of Missouri, have invented certain new and useful Improvements in Hose-Couplings, of which the following is a specification, reference being had therein to the accompanying drawings.

This invention relates to improvements in hose-couplings; and it consists in the novel arrangement, construction, and combination of parts, as will be fully hereinafter described, and set forth in the claim.

The object of this invention is to construct a coupling, the parts being rapidly connected and released to form a perfect hose-joint.

A further object is the parts are arranged to be attached to the present coupling of a fire-hose without changing the construction of same.

Figure 1 is a vertical longitudinal sectional view of my complete coupling in connected position and attached to the common couplings of the fire-hose. Fig. 2 is a side elevation of the male member of my improved coupling. Fig. 3 is a longitudinal sectional view of the female member. Fig. 4 is a front elevation of the male member. Fig. 5 is a front elevation of the female member.

In the construction of my improved coupling I provide two members 6 and 7. The member 6, being the male member, consists of a sleeve 8, provided with screw-threads 9 on its outer periphery. The said sleeve 8 is also provided with a flange 10, which is cut away in three instances, forming the passages 11, which are on a line flush with the sleeve 8. The outer end has a tapering face 12, which acts as a guide as well as contacting with a gasket to form a perfect joint. At one end of each of the flanges 10 is formed a nib 13 and at the other a stop-pin 14, the purpose of which will be fully hereinafter described.

The female member 7 consists of a cylinder having internal screw-threads 15, an internal tapering flange 16, and lugs 17, which is to correspond with the passages 11 of the member 6. A flange 18 extends forwardly from the free end and is arranged to fit closely over the female member 19 of the present common coupling (see Fig. 1) to form a preventative from the lodging of foreign substances.

A gasket 20, of rubber or other suitable resilient material, is placed between the tapered flange 16 and the first one of the threads 15, said gasket being tapered in form to provide resilience and yet have sufficient stiffness to closely contact with the edge of the tapered face 12 to form a leak-proof joint.

The members are attached to the couplings now in use on the fire-hose, the male member 6 screwed in the swivel of the member 21 and the female member 7 screwed on the member 22.

The edge 23 of the flanges 10 is tapered inwardly, as indicated by the numeral 24.

The operation of my invention is as follows: The members of my improved coupling are attached to the present couplings now attached to the fire-hose. To couple the members, the member 6 is inserted in the member 7, the lugs 17 passing through the passages 11, the member 7 is turned to the right with a pressure inwardly causing said lugs to ride over the nib 13 until the end of the lugs 17 contacts with the stops 14, when the lugs will then seat themselves between the nibs and stops. The tension causing this action is brought about by the gasket 20 communicating with the end of the member 6. To relieve the couplings, the action is reversed. It is easily and rapidly coupled, as well as uncoupled, with but a slight motion.

The members may be formed with a sleeve sufficient to permit them to be applied to the hose direct—for example, as for garden-hose.

Having fully described my invention, what I claim is—

A hose-coupling comprising a member 6 having an integral tapering face 12, passages 11 formed in said face, stops 14 formed on said member 6, and in alinement with one end of the passage, in combination with a member 7, having internal integral inwardly-projecting lugs 17, an outwardly-projecting flange 18, and an inwardly-projecting flange 16, in combination with a gasket 20, substantially as specified.

In testimony whereof I affix my signature in presence of two witnesses.

RUDOLPH F. SETTLAGE.

Witnesses:
 FRED MICHELS,
 HENRY WEBSTER.